(12) United States Patent
Hung et al.

(10) Patent No.: US 11,366,499 B2
(45) Date of Patent: Jun. 21, 2022

(54) COMPUTER HOST SYSTEM

(71) Applicant: HONG FU JIN PRECISION INDUSTRY (WuHan) CO., LTD., Wuhan (CN)

(72) Inventors: Wen-Hsiang Hung, New Taipei (TW); Jun-Bo Yang, Wuhan (CN); Ching-Jou Chen, New Taipei (TW)

(73) Assignee: HONG FU JIN PRECISION INDUSTRY (WuHan) CO., LTD., Wuhan (CN)

( * ) Notice: Subject to any disclaimer, the term of this patent is extended or adjusted under 35 U.S.C. 154(b) by 207 days.

(21) Appl. No.: 16/956,186

(22) PCT Filed: Jan. 8, 2020

(86) PCT No.: PCT/CN2020/071014
§ 371 (c)(1),
(2) Date: Jun. 19, 2020

(87) PCT Pub. No.: WO2021/138853
PCT Pub. Date: Jul. 15, 2021

(65) Prior Publication Data
US 2022/0137679 A1 May 5, 2022

(51) Int. Cl.
*G06F 1/16* (2006.01)
*G06F 1/18* (2006.01)
*G06F 1/20* (2006.01)

(52) U.S. Cl.
CPC ............... *G06F 1/181* (2013.01); *G06F 1/20* (2013.01); *G06F 2200/201* (2013.01)

(58) Field of Classification Search
CPC .... G06F 1/181; G06F 1/20; G06F 2200/1635; G06F 1/16; H05K 5/0021; H05K 7/1435; H05K 7/1422; H05K 7/1441
USPC .. 361/724, 679.6, 679.02, 725, 735, 679.01, 361/679.46, 679.32; 312/223.2, 265.6, 312/265.5; 454/184
See application file for complete search history.

(56) References Cited

U.S. PATENT DOCUMENTS

2007/0281531 A1* 12/2007 Cheng .................... G06F 1/181
439/304
2015/0185792 A1 7/2015 Li

FOREIGN PATENT DOCUMENTS

| CN | 101089776 A | 12/2007 |
|---|---|---|
| CN | 100495290 C | 6/2009 |
| CN | 203720760 U | 7/2014 |

(Continued)

*Primary Examiner* — Mandeep S Buttar
(74) *Attorney, Agent, or Firm* — ScienBiziP, P.C.

(57) ABSTRACT

A computer host system includes a housing and at least one of a top expansion frame and side expansion frames. The housing includes a front panel, a rear panel, a top panel, and side panels. The top panel and the side panels are detachably installed respectively on top and both sides of the front and rear panels. The top expansion frame is installed on top of the front and rear panels to expand an accommodating space at a top portion of the housing. The side expansion frames are installed on both sides of the front and rear panels and used to expand an accommodating space on both sides of the housing. The top expansion frame has a same cross-sectional shape as the top portion of the housing, and the side expansion frame has a same cross-sectional shape as a side of the housing.

10 Claims, 5 Drawing Sheets

(56) References Cited

FOREIGN PATENT DOCUMENTS

| CN | 205028217 U | 2/2016 |
| CN | 207133726 U | 3/2018 |

* cited by examiner

COMPUTER HOST SYSTEM

FIELD

The disclosure relates to a computer host system.

BACKGROUND

At present, when an existing computer host system needs to add additional components, since the existing computer host system does not have the function of expanding the accommodating space, it is impossible to add additional components as the demand increases.

SUMMARY OF THE DISCLOSURE

In view of this, it is necessary to provide a computer host system that can expand the accommodating space.

In an embodiment of the present disclosure, a computer host system includes a housing, and further includes at least one of a top expansion frame and side expansion frames. The housing includes a front panel, a rear panel, a top panel, and side panels. The top panel and the side panels are detachably installed on top and both sides of the front panel and the rear panel, respectively. The top expansion frame is installed on top of the front panel and the rear panel for expanding an accommodating space on a top portion of the housing. The side expansion frames are installed on both sides of the front panel and the rear panel for expanding an accommodating space on both sides of the housing. The top expansion frame has a cross-sectional shape the same as the top portion of the housing, and the side expansion frame has a cross-sectional shape the same as a side surface of the housing.

In an embodiment of the present disclosure, when expanding the top space of the housing, the top panel is removed and the top expansion frame is installed on top of the front panel and the rear panel, and then the top panel is installed on top of the top expansion frame for sealing.

In an embodiment of the present disclosure, when expanding the space on both sides of the housing, the side panels are removed and the side expansion frames are installed on sides of the front panel and the rear panel, then the side panels are installed on sides of the side expansion frames facing away from the housing for sealing.

In an embodiment of the present disclosure, the computer host system further includes a cooling system, and the top expansion frame is used to receive the cooling system.

In an embodiment of the present disclosure, the computer host system further includes an adaptor board, and a slot is provided on the adaptor board. The slot is used to connect a plug-in member, and the side expansion frame is used to accommodate an additional adapter board and the plug-in member.

In an embodiment of the present disclosure, the computer host system further includes a hard disk, and the side expansion frame is also used to accommodate an additional hard disk.

In an embodiment of the present disclosure, a socket is provided at a position corresponding to the rear panel and the slot. The socket is used to insert and fix the plug-in member, and a side wall of the side expansion frame adjacent to the rear panel has an additional socket for fixing the additional plug-in member.

In an embodiment of the present disclosure, the cooling system may be at least one of a fan or a liquid cooling device.

In an embodiment of the present disclosure, a plurality of the top expansion frames may be stacked and installed on the top portion of the housing, and at this time, the top panel is installed on a top surface of a top-most top expansion frame.

In an embodiment of the present disclosure, a plurality of the side expansion frames may be superimposed and installed on both sides of the housing, and at this time, the side panels are installed on sides of the outermost side expansion frames facing away from the housing.

The above-described computer host system achieves the purpose of expanding the accommodating space of the housing through the top expansion frame, the side expansion frames, and the detachable top panel and side panels.

SYMBOL DESCRIPTION OF MAIN COMPONENTS

Figure 1:
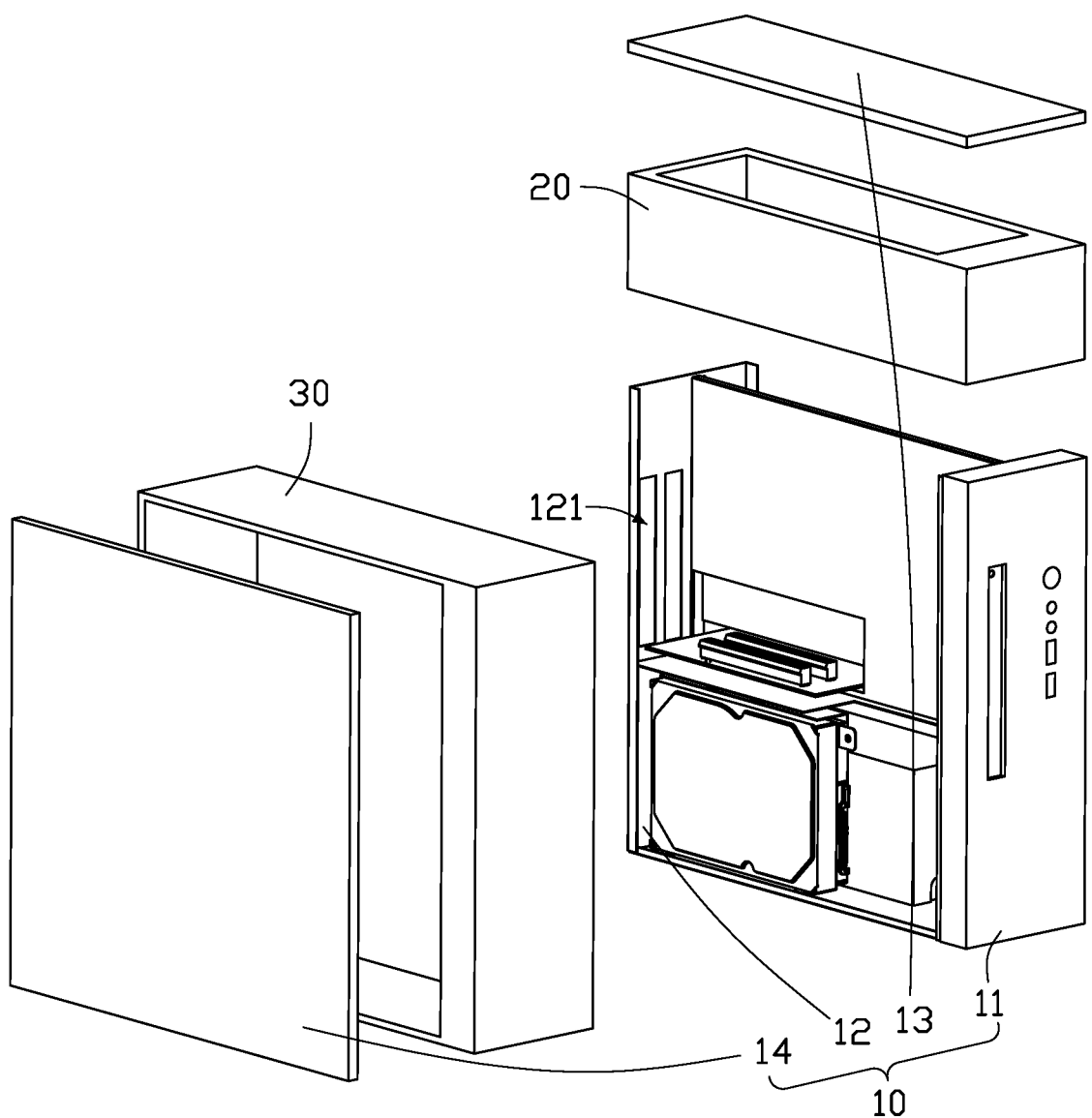
FIG. 1 is an exploded view of a housing, a top expansion frame, and side expansion frames in an embodiment of the present disclosure.

100 computer host system
10 housing
11 front panel
12 rear panel
13 top panel
14 side panel
121, 31 socket
20 top expansion frame
30 side expansion frame
40 cooling device
50 adapter board
51 slot
60 hard disk

DETAILED DESCRIPTION

The technical solutions in the embodiments of the present disclosure will be described clearly and completely in conjunction with the drawings in the embodiments of the present disclosure. Obviously, the described embodiments are only a part of the embodiments of the present disclosure, but not all of the embodiments. Based on the embodiments of the present disclosure, all other embodiments obtained by a person of ordinary skill in the art without making creative work fall within the protection scope of the present disclosure.

It should be noted that when a component is said to be "fixed to" another component, it can be fixed directly to another component or it can be fixed indirectly through an intermediate component. When a component is considered to "connect" to another component, it can be directly connected to another component or it can be indirectly connected through an intermediate component. When a component is considered to be "set on" another component, it can be set directly on another component or indirectly through an intermediate component. The terms "vertical", "horizontal", "left", "right" and similar expressions used herein are for illustrative purposes only.

Unless otherwise defined, all technical and scientific terms used herein have the same meaning as commonly understood by those skilled in the technical field of the present disclosure. The terminology used in the description of the present disclosure herein is for the purpose of describing specific embodiments, and is not intended to limit the present disclosure. The term "or/and" as used herein includes any and all combinations of one or more related listed items.

The following describes some embodiments of the present disclosure in detail with reference to the accompanying drawings. In the case of no conflict, the following embodiments and features in the embodiments can be combined with each other.

Referring to FIG. 1, FIG. 1 is a three-dimensional schematic diagram of a computer host system 100 according to an embodiment of the present disclosure. The computer host system 100 includes a housing 10, a top expansion frame 20, and side expansion frames 30. The housing 10 includes a front panel 11, a rear panel 12, a top panel 13, and side panels 14. The front panel 11 and the rear panel 12 are fixed. The top panel 13 and the side panels 14 are detachably installed on top and both sides of the front panel 11 and the rear panel 12 for sealing. The top expansion frame 20 is installed on top of the front panel 11 and the rear panel 12 to expand an accommodating space on a top portion of the housing 10, and the side expansion frames 30 are installed on both sides of the front panel 11 and the rear panel 12 to expand an accommodating space on both sides of the housing 10. The top expansion frame 20 has a same cross-sectional shape as the top portion of the housing 10, and the side expansion frame 30 has a same cross-sectional shape as a side surface of the housing 10.

Figure 2:
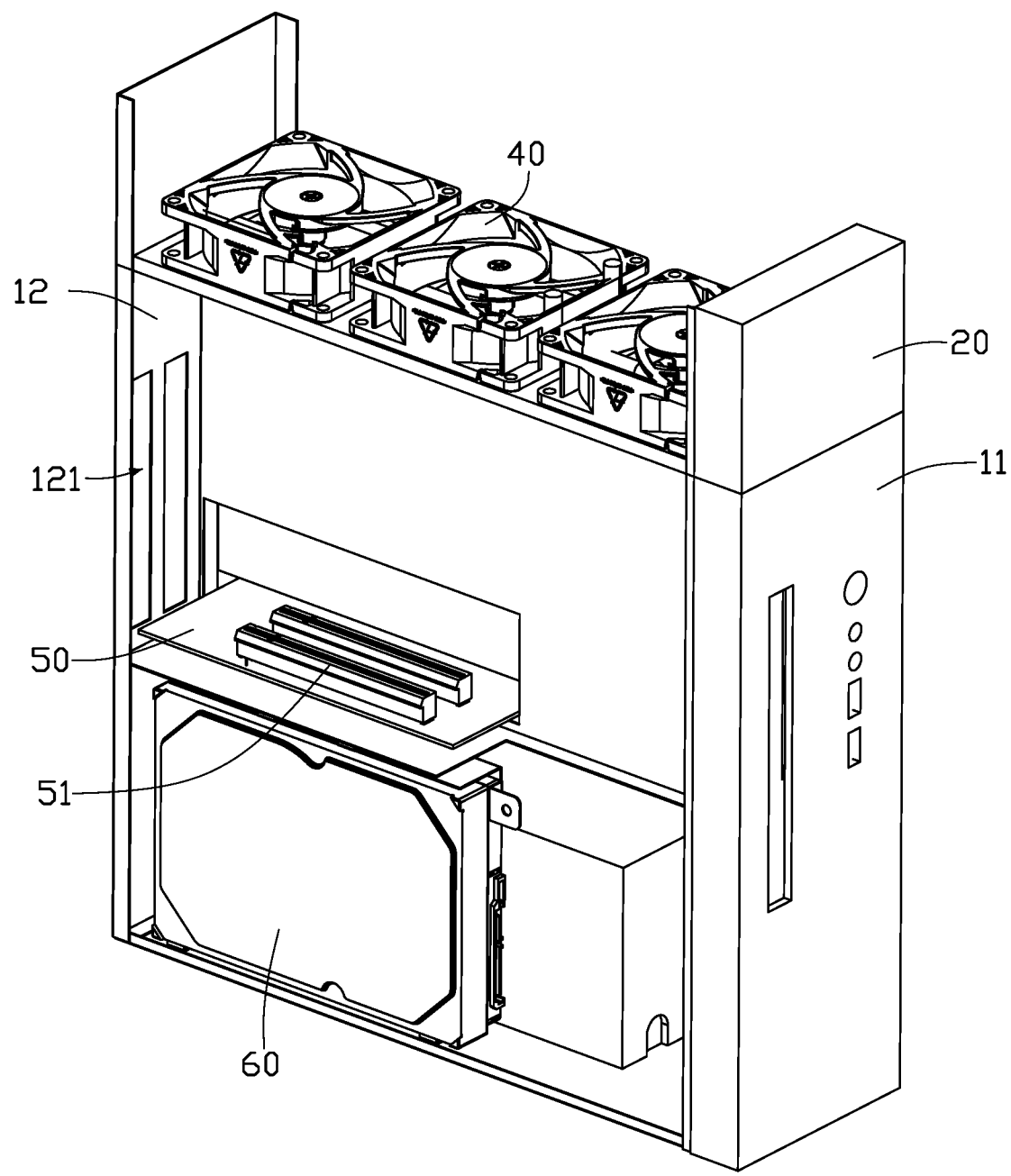
FIG. 2 is a schematic perspective view of the inside of the housing, the top expansion frame, and a cooling device in an embodiment of the disclosure.

Referring to FIG. 2, when the space at the top portion of the housing 10 needs to be expanded, the top panel 13 (not shown in FIG. 2) is first removed from the front panel 11 and the rear panel 12, the top expansion frame 20 is installed on top of the front panel 11 and the rear panel 12, and then the top panel 13 is installed on top of the top expansion frame 20 for sealing.

Figure 3:
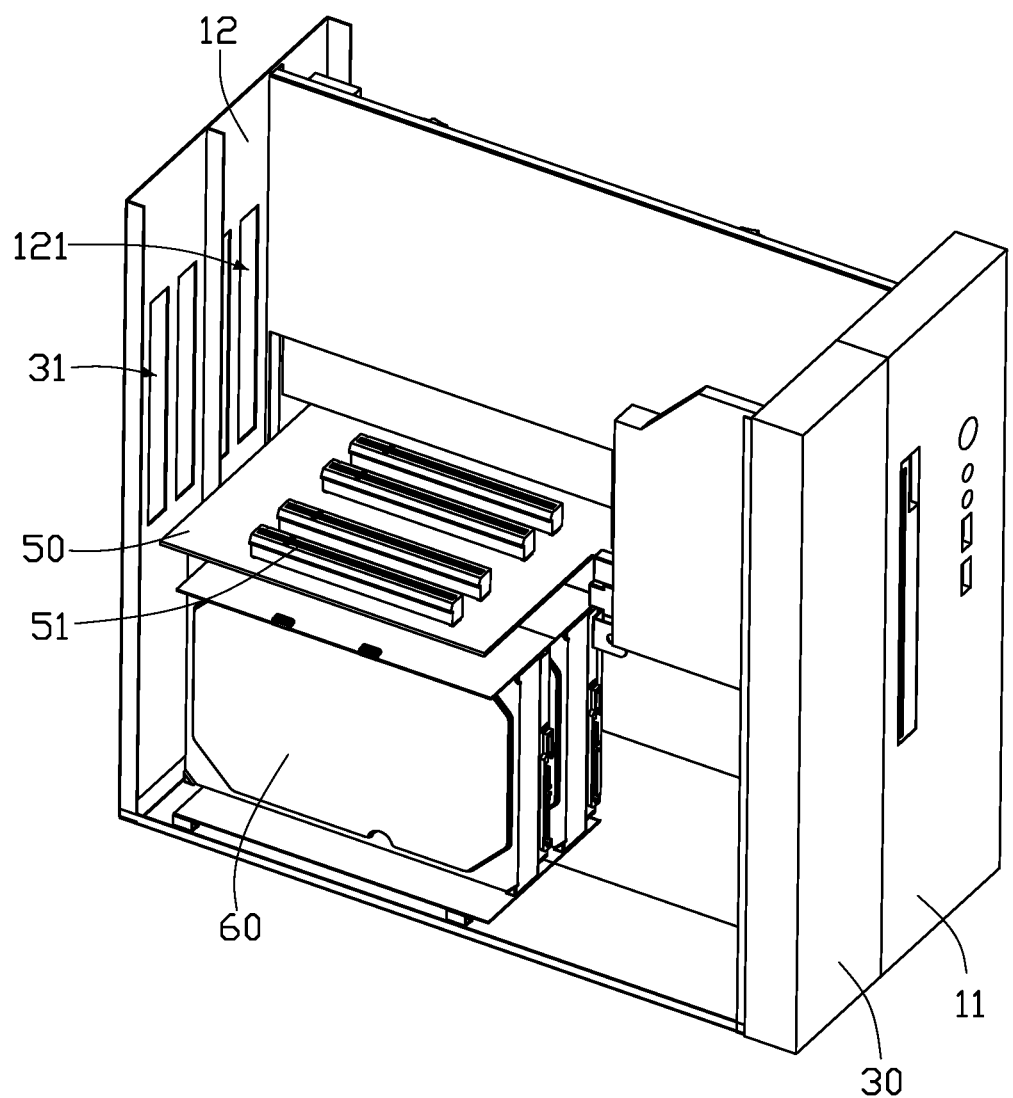
FIG. 3 is a perspective schematic view of the inside of the housing and the side expansion frames in an embodiment of the disclosure.

Referring to FIG. 3, when the space on a side of the housing 10 needs to be expanded, the side panel 14 (not shown in FIG. 3) is first removed from the front panel 11 and the rear panel 12, the side expansion frame 30 is installed on the side of the front panel 11 and the rear panel 12, and then the side panel 14 is installed on the side of the side expansion frame 30 facing away from the housing 10 for sealing.

Referring to FIG. 2, the computer host system 100 further includes a cooling device 40. When the cooling device 40 cannot be installed due to the limited space of the housing 10, the top expansion frame 20 is installed on the top portion of the housing 10 for housing the cooling device 40. The cooling device 40 is used to cool the internal components of the computer host system 100 so that the computer host system 100 can use a central processor with higher power and higher operating temperature. In an embodiment of the disclosure, the cooling device 40 is a plurality of fans.

Referring to FIGS. 1 and 3, in an embodiment of the present disclosure, the computer host system 100 further includes an adapter board 50. The adapter board 50 is provided with slots 51, and each of the slots 51 is used to connect with a plug-in member. The adapter board 50 in the housing 10 originally has two slots 51 (there are two slots 51 in FIG. 1). When it is necessary to transfer two additional plug-in members, the adapter board 50 having two slots 51 is replaced with an adapter board 50 having four slots 51 (there are four slots 51 in FIG. 3). However, since the housing 10 has the limited space and cannot accommodate the adapter board 50 having four slots 51, the side expansion frame 30 is installed on the housing 10, and the side expansion frame 30 can be used to accommodate the adapter board 50 having four slots 51 and the two additional plug-in members.

The computer host system 100 also includes a hard disk 60. There is originally one hard disk 60 in the housing 10 (there is a hard disk 60 in FIG. 1). When an additional hard disk 60 needs to be transferred, since the housing 10 has the limited space and cannot accommodate another hard disk 60, the side expansion frame 30 is installed on the housing 10, and the side expansion frame 30 can be used to accommodate one additional hard disk 60 (there are two hard disks 60 in FIG. 3).

Referring to FIGS. 1 and 3, in an embodiment of the present disclosure, two sockets 121 (there are two sockets 121 in FIG. 1) are provided at positions corresponding to the rear panel 12 and the slots 51. The socket 121 is used to insert and fix the plug-in member. When two additional plug-in members are required, the side expansion frame 30 is provided with the same two sockets 31 on a side wall adjacent to the rear panel 12 for fixing the two additional plug-in members.

Figure 4:
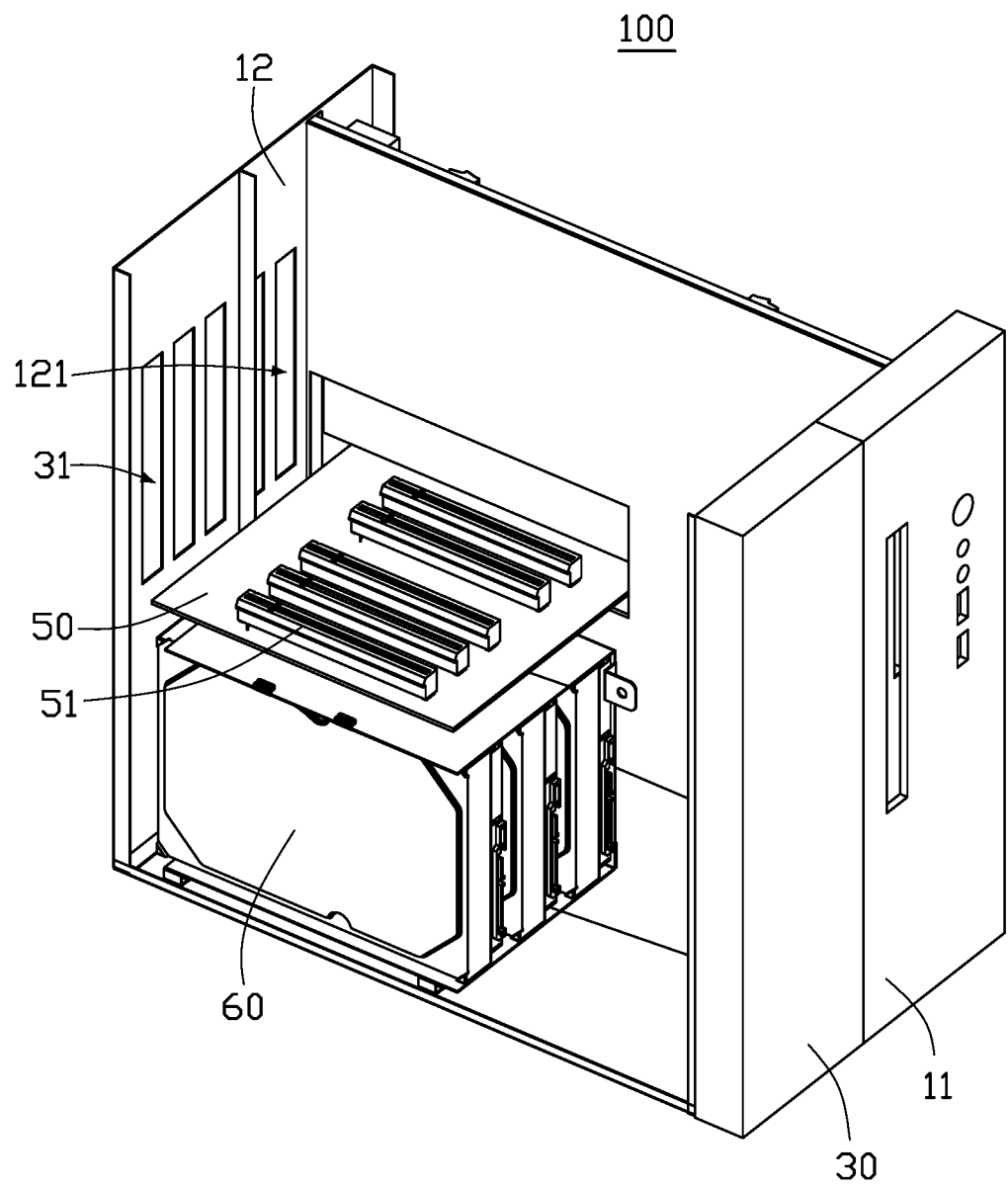
FIG. 4 is a perspective schematic view of the inside of the housing and the side expansion frames in an embodiment of the disclosure.

Referring to FIG. 4, in another embodiment, when the computer host system 100 needs to transfer three additional plug-in members (there are two slots in FIG. 1 and five slots in FIG. 4), the original adapter board 50 having two slots 51 is replaced with an adapter board 50 having five slots 51. Since the housing 10 cannot accommodate the adapter board 50 having five slots 51, the side expansion frame 30 is installed on the housing 10, and the side expansion frame 30 can be used to accommodate the adapter board 50 having five slots 51 and the three additional plug-in members. At the same time, the side expansion frame 30 is provided with the same three sockets 31 on the side wall adjacent to the rear panel 12 for inserting and fixing the three additional plug-in members. In addition, in this embodiment, the side expansion frame 30 can also accommodate two extra hard disks 60 (there is one hard disk 60 in FIG. 1 and three hard disks 60 in FIG. 4).

Figure 5:
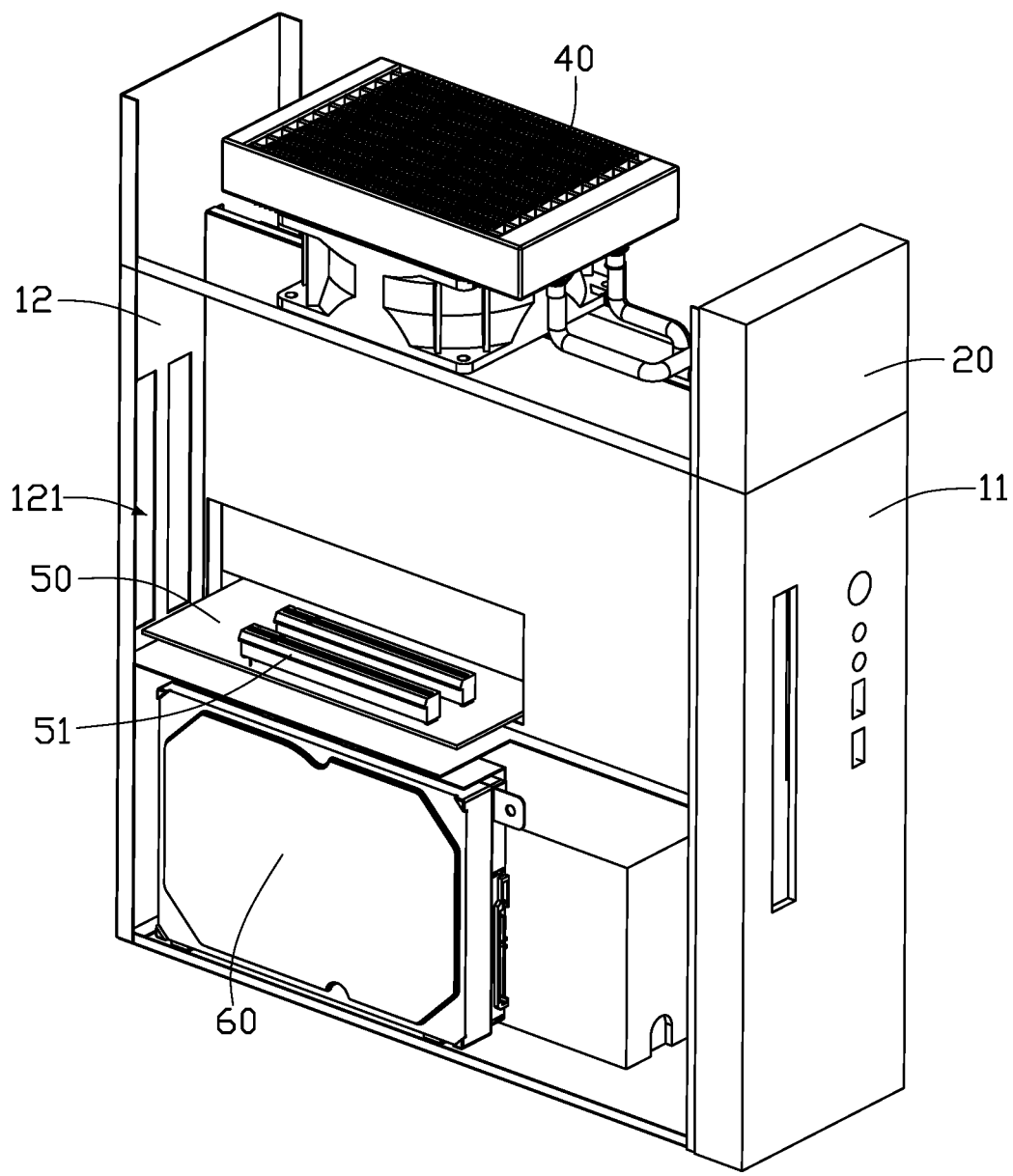
FIG. 5 is a schematic perspective view of the inside of the housing, the top expansion frame, and the cooling device in an embodiment of the disclosure.

Referring to FIG. 5, in another embodiment of the top expansion frame 20, the cooling device 40 may be a liquid cooling device.

In other embodiments, a number of the top expansion frames 20 can be stacked and used as the space required by the computer host system 100 increases, that is, the top portion of the housing 10 can be connected to multiple top expansion frames 20, and the top panel 13 is installed on a top surface of a top-most top expansion frame 20. A number of the side expansion frames 30 can be superimposed and used as the space required by the computer host system 100 increases, that is, multiple side expansion frames 30 can be connected to both sides of the housing 10. At this time, the side panel 14 is installed on a side of the outermost side expansion frame 30 facing away from the housing 10.

It can be understood that the top expansion frame 20 and the side expansion frame 30 may exist at the same time, or at least one of them may exist alone.

In addition, in an embodiment of the present disclosure, the sockets 121 and 31 are PCIe sockets; the hard disk 60 is 3.5-inch or 2.5-inch; the plug-in members may be graphics cards, network cards, sound cards, or other external functional components.

The computer host system 100 achieves the purpose of expanding the accommodating space of the housing 10 through the top expansion frame 20, the side expansion frame 30, and the detachable top panel 13 and side panel 14.

The above embodiments are only used to illustrate the technical solutions of the present disclosure and not to limit them. Although the present disclosure has been described in detail with reference to the above preferred embodiments, those of ordinary skill in the art should understand that the technical solutions of the present disclosure can be modified or equivalently replaced without deviating from the spirit and scope of the technical solutions of the present disclosure. Those skilled in the art can also make other changes within the spirit of the present disclosure and use them in the design of the present disclosure, as long as they do not deviate from the technical effects of the present disclosure. These changes made in accordance with the spirit of the present disclosure should be included in the scope claimed by the present disclosure.

What is claimed is:

1. A computer host system comprising: a housing and at least one of a top expansion frame and side expansion frames, wherein the housing comprises a front panel, a rear panel, a top panel, and side panels, the top panel and the side panels are detachably installed on top and both sides of the front panel and the rear panel, respectively, and the top expansion frame is installed on top of the front panel and the rear panel for expanding an accommodating space at a top portion of the housing, the side expansion frames are installed on both sides of the front panel and the rear panel for expanding an accommodating space on both sides of the housing, the top expansion frame and the top portion of the housing have a same cross-sectional shape, and the side expansion frame and a side surface of the housing have a same cross-sectional shape.

2. The computer host system according to claim 1, wherein when expanding a top space of the housing, the top panel is removed and the top expansion frame is installed on top of the front panel and the rear panel, and the top panel is installed on top of the top expansion frame for sealing.

3. The computer host system according to claim 1, wherein when expanding the space on both sides of the housing, the side panels are removed and the side expansion frames are installed on sides of the front panel and the rear panel, and then the side panels are installed on sides of the side expansion frames facing away from the housing for sealing.

4. The computer host system according to claim 2, further comprising a cooling device, and the top expansion frame is used to receive the cooling device.

5. The computer host system according to claim 3, further comprising an adapter board, and the adapter board is provided with a slot, the slot is used to connect a plug-in member, the side expansion frame is used to accommodate an additional adapter board and the plug-in member.

6. The computer host system according to claim 5, further comprising a hard disk, and the side expansion frame is further used to accommodate an additional hard disk.

7. The computer host system according to claim 5, wherein a socket is provided at a position corresponding to the rear panel and the slot, the socket is used for inserting and fixing the plug-in member, a side wall of the side expansion frame adjacent to the rear panel is provided with additional sockets to fix additional plug-in members.

8. The computer host system of claim 4, wherein the cooling device may be at least one of a fan or a liquid cooling device.

9. The computer host system according to claim 2, wherein a plurality of the top expansion frames are stacked and installed on the top portion of the housing, and at this time, the top panel is installed on a top surface of a top-most top expansion frame.

10. The computer host system according to claim 3, wherein a plurality of the side expansion frames are superimposed and installed on both sides of the housing, in which case the side panels are installed on a side of an outermost side expansion frame facing away from the housing.

* * * * *